United States Patent
Reynolds et al.

(10) Patent No.: US 10,100,849 B2
(45) Date of Patent: Oct. 16, 2018

(54) OIL EXCHANGE IN HYDRAULICALLY OPERATED AND ELECTRO-HYDRAULICALLY OPERATED HYDRAULIC VALVES

(71) Applicant: Parker-Hannifin Corporation, Cleveland, OH (US)

(72) Inventors: Dennis L. Reynolds, Fort Wayne, IN (US); Brian Slattery, Hicksville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/320,536

(22) PCT Filed: Jun. 23, 2015

(86) PCT No.: PCT/US2015/037135
§ 371 (c)(1),
(2) Date: Dec. 20, 2016

(87) PCT Pub. No.: WO2015/200295
PCT Pub. Date: Dec. 30, 2015

(65) Prior Publication Data
US 2017/0198727 A1      Jul. 13, 2017

Related U.S. Application Data

(60) Provisional application No. 62/015,737, filed on Jun. 23, 2014.

(51) Int. Cl.
*F15B 13/04*      (2006.01)
*F15B 13/043*    (2006.01)
(Continued)

(52) U.S. Cl.
CPC ........ *F15B 13/0402* (2013.01); *F15B 13/043* (2013.01); *F16K 11/07* (2013.01);
(Continued)

(58) Field of Classification Search
CPC ................ F15B 13/0402; F15B 13/043; F15B 2211/3105; F15B 2211/355; F16K 11/07;
(Continued)

(56) References Cited

U.S. PATENT DOCUMENTS

| 2,904,055 A | 9/1959 | Witherell |
| 2,931,343 A | 4/1960 | Moog, Jr. |

(Continued)

FOREIGN PATENT DOCUMENTS

| JP | S62 56602 A | 3/1987 | |
| JP | S62 110006 A | 5/1987 | |
| JP | WO 2013137235 A1 * | 9/2013 | .............. F16K 11/07 |

OTHER PUBLICATIONS

International Search Report and Written Opinion for corresponding Patent Application No. PCT/US2015/037135 dated Oct. 6, 2015.
(Continued)

*Primary Examiner* — Kevin Murphy
*Assistant Examiner* — Kelsey Cary
(74) *Attorney, Agent, or Firm* — McDonnell Boehnen Hulbert & Berghoff LLP

(57) ABSTRACT

A hydraulic valve includes a valve body having first and second ends, a bore extending therebetween, and first and second drain passages opening to the bore; a spool disposed in the bore and biased in a neutral position, the spool having first and second ends and first and second annuli axially spaced from the first and second ends respectively, whereby when the spool is in the neutral position, the first and second drain passages are connected to first and second bores respectively via the respective annulus, and wherein the
(Continued)

spool is axially movable relative to the body by fluid acting on one of the ends to block fluid flow from the first and second bores to the first and second drain passages.

11 Claims, 2 Drawing Sheets

(51) Int. Cl.
 *F16K 11/07* (2006.01)
 *F15B 13/042* (2006.01)
 *F15B 21/04* (2006.01)
(52) U.S. Cl.
 CPC .......... *F15B 13/042* (2013.01); *F15B 21/042* (2013.01); *F15B 21/045* (2013.01); *Y10T 137/8671* (2015.04); *Y10T 137/86582* (2015.04)
(58) Field of Classification Search
 CPC ....... Y10T 137/8671; Y10T 137/86582; Y10T 137/8667

USPC ............... 137/625.69, 625.6, 625.25, 625.66
 See application file for complete search history.

(56) References Cited

U.S. PATENT DOCUMENTS

| | | | |
|---|---|---|---|
| 4,011,891 A | | 3/1977 | Knutson et al. |
| 5,579,807 A | | 12/1996 | Kohler |
| 5,682,744 A | * | 11/1997 | Hasegawa ............... B62D 5/087 137/625.3 |
| 5,806,565 A | | 9/1998 | Kadlicko |
| 2012/0292540 A1 | * | 11/2012 | Bruck ................. F16K 11/0716 251/14 |
| 2015/0013805 A1 | * | 1/2015 | Terao ...................... F16K 11/07 137/625.6 |

OTHER PUBLICATIONS

"MOOG: Electrohydraulic Valves . . . A Technical Look", http://www.moog.com/literature/ICD/Valves-Introduction.pdf, May 12, 2013.

\* cited by examiner

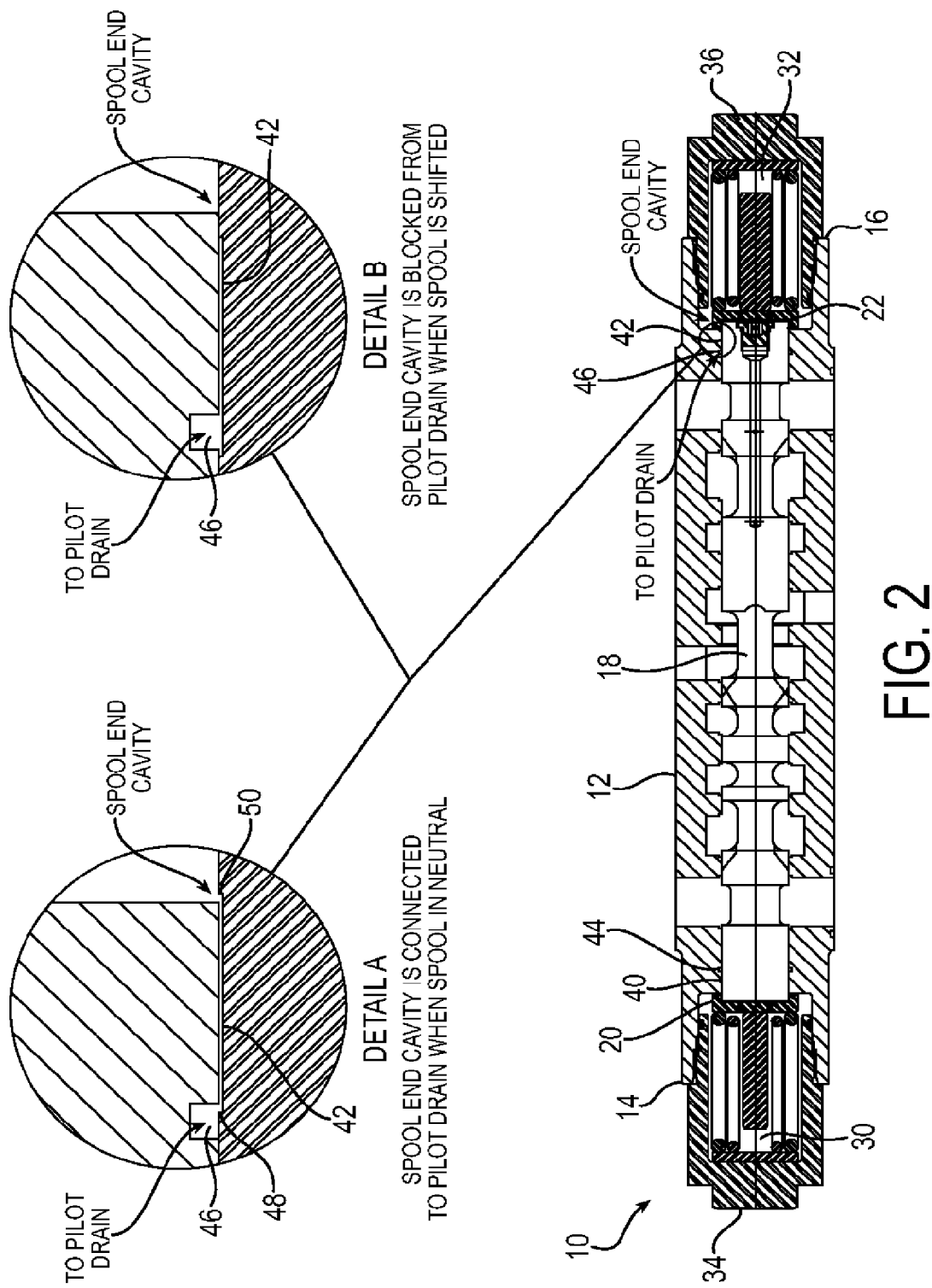

US 10,100,849 B2

OIL EXCHANGE IN HYDRAULICALLY OPERATED AND ELECTRO-HYDRAULICALLY OPERATED HYDRAULIC VALVES

RELATED APPLICATION DATA

This application is a national phase of International Application No. PCT/US2015/037135 filed Jun. 23, 2015 and published in the English language, which claims priority to U.S. Provisional Application No. 62/015,737 filed Jun. 23, 2014, which are hereby incorporated herein by reference in their entirety.

FIELD OF INVENTION

The present invention relates generally to hydraulic valves, and more particularly to hydraulic valves having spools allowing for communication between spool end bores and respective pilot drain chambers in a neutral position and preventing fluid flow between the end bores and drain chambers when the spool is axially shifted.

BACKGROUND

Hydraulic valves are connected to movable members of construction and industrial equipment. Examples of these movable members are cylinders and hydraulic motors. The flow of fluid to and from each movable member is typically controlled by a spool valve, which in turn is controlled manually or by hydraulic proportional pressure reducing valves, that themselves are controlled either manually or electro-hydraulically. Hydraulic valves consist of a body with a pair of work ports and a pump inlet, a tank outlet and a drain outlet. A spool inside the body controls the flow of fluid to and from the different ports. The spool is operated by selectively applying pressurized fluid to one end or the other of the spool. That pressure is provided by either a manually operated proportional pressure reducing valve and a conduit that is attached to the body or an electro-hydraulic proportional pressure reducing valve that is directly attached to the body.

SUMMARY

According to a first embodiment, a hydraulic valve includes a valve body having first and second ends, a bore extending therebetween, and first and second drain passages opening to the bore; a spool disposed in the bore and biased in a neutral position, the spool having first and second ends and first and second annuli axially spaced from the first and second ends respectively, whereby when the spool is in the neutral position, the first and second drain passages are connected to first and second bores respectively via the respective annulus, and wherein the spool is axially movable relative to the body by fluid acting on one of the ends to block fluid flow from the first and second bores to the first and second drain passages.

Optionally, each annulus has a first end and a second end closer to the respective end of the spool than the first end.

Optionally, the second end is configured to seal against the bore when the spool has been moved axially to block fluid flow through the annulus.

Optionally, the spool is axially movable relative to the body by fluid acting on one of the ends to block fluid flow from the end bore to the at least one drain passage by axially moving the annulus out of fluidic communication with the end bore and/or drain passage.

Optionally, the hydraulic valve includes first and second end caps coupled to the first and second ends of the valve body respectively and defining with the ends respective end bores.

Optionally, the hydraulic valve includes one or more resilient members disposed in each end bore biasing the spool in the neutral position.

According to another embodiment, a hydraulic valve includes a valve body having first and second ends, a bore extending therebetween, and at least one drain passage opening to the bore; a spool disposed in the bore, the spool having first and second ends and at least one annulus proximate one of the ends and terminating before said end, whereby when the spool is in the neutral position, the at least one drain passage is connected to an end bore via the at least one annulus, and wherein the spool is axially movable relative to the body by fluid acting on one of the ends to block fluid flow from the end bore to the at least one drain passage by axially moving the annulus out of fluidic communication with the end bore and/or drain passage.

Optionally, the hydraulic valve includes first and second end caps coupled to the first and second ends of the valve body respectively and defining with the ends respective end bores.

Optionally, the hydraulic valve includes one or more resilient members disposed in each end bore biasing the spool in the neutral position.

According to another embodiment, a hydraulic valve includes a valve body having first and second ends, a bore extending therebetween, and first and second drain passages opening to the bore; a spool disposed in the bore and having first and second ends and first and second annuli axially spaced from the first and second ends respectively; first and second end caps coupled to the first and second ends of the valve body respectively and defining with the ends and respective end bores; and one or more resilient members disposed in each end bore biasing the spool in a neutral position where the first and second drain passages are connected to the first and second end bores respectively via the respective annulus, and wherein the spool is axially movable relative to the body by fluid acting on one of the ends to block fluid flow from the first and second end bores to the first and second drain passages.

BRIEF DESCRIPTION OF THE DRAWINGS

FIG. 2 is another cross-sectional view of the exemplary hydraulic valve.

DETAILED DESCRIPTION

Figure 1:
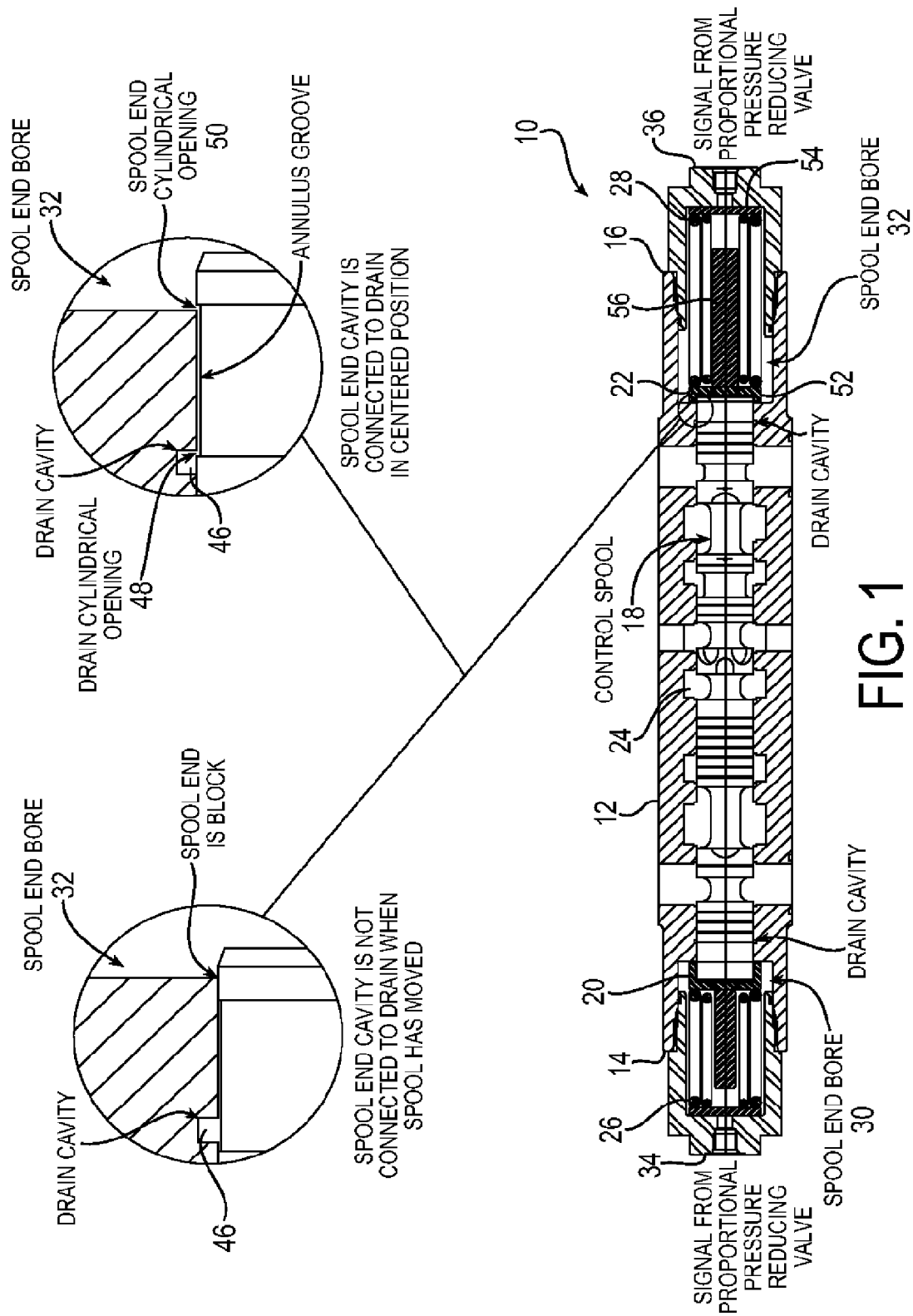
FIG. 1 is a cross-sectional view of an exemplary hydraulic valve according to the invention.

Turning now to FIG. 1, a hydraulic valve 10 is provided that includes a valve body 12 having first and second ends 14 and 16, a bore 24 extending therebetween, and first and second drain passages 44, and 46 opening to the bore 24, and a spool 18 disposed in the bore 24 and biased in a neutral position, the spool having first and second ends 20 and 22 and first and second annuli axially spaced from the first and second ends 20 and 22 respectively. That is, the annuli are proximate the respective ends and terminate before said ends, i.e. do not extend along the length of the spool all the way to the ends 20 and 22. When the spool is in the neutral position, the first and second drain passages 44 and 46 are connected to first and second bores 30 and 32 respectively via the respective annulus 40, 42. The spool is axially movable relative to the body 12 by fluid acting on one of the ends 20 and 22 to block fluid flow from the first and second bores 30 and 32 to the first and second drain passages 44 and 46. Each annulus has a first end 48 and a second end 50 closer to the respective end of the spool than the first end. The second end is configured to seal against the bore when the spool has been moved axially to block fluid flow through the annulus. The first end 48 is configured to seal against the bore when the spool has been moved axially in the opposite direction to block fluid flow through the annulus.

The spool is axially movable relative to the body by fluid acting on one of the ends to block fluid flow from the end bore to the at least one drain passage by axially moving the annulus out of fluidic communication with the end bore and/or drain passage. The valve further includes first and second end caps 34 and 36 coupled to the first and second ends 14 and 16 of the valve body 12 respectively and defining with the ends 14 and 16 respective end bores 30 and 32, and one or more resilient members 26 and 28 disposed in each end bore 30 and 32 biasing the spool 18 in the neutral position. Disposed in each bore 30, 32 is a retainer 52 and a plate 54 that serve as seats for the resilient members 26, 28, and a pin 56 that serves as a stop when the spool 18 has been moved axially.

The hydraulic valves 10 are connected to movable members of construction and industrial equipment. Examples of these movable members are cylinders and hydraulic motors. The flow of fluid to and from each movable member is typically controlled by a spool valve, which in turn is controlled manually or by hydraulic proportional pressure reducing valves, that themselves are controlled either manually or electro-hydraulically. The hydraulic valve 10 consist of a body 12 having first and second ends 14 and 16 and a plurality of ports, such as a pair of work ports and a pump inlet, a tank outlet and a drain outlet. A spool 18 inside the body 12 controls the flow of fluid to and from the different ports. The spool 18 has first and second ends 20 and 22, and is operated by selectively applying pressurized fluid to one end 20, 22 or the other end 20, 22 of the spool. That pressure is provided by either a manually operated proportional pressure reducing valve and a conduit that is attached to the body 12 or the ends 34, 36, or an electro-hydraulic proportional pressure reducing valve that is directly attached to the body 12 or the ends 34, 36. The present application relates to the exchange of oil from the proportional pressure reducing valves to the pressurized ends of the spools.

The movement of the control spool 18, which resides in a bore 24 inside the hydraulic valve, opens and closes passages between the movable members and hoses or pipes that connect to a pump and a reservoir. The control spool 18 is spring biased to its center position by one or more resilient members 26 and 28, such as springs, which are provided in respective spool end bores 30 and 32 between respective end caps 34 and 36 and the body 12. Other hydraulic lines are attached to the openings at each end of the control spool bores. These hydraulic lines lead to the manually operated proportional pressure reducing valves located at the operator's station. When the manually operated proportional pressure reducing valves are not activated, the bores at the ends of the control spool are connected to a drain outlet, via the pressure reducing valves. The drain outlet is a dedicated line connecting the hydraulic valve to the fluid reservoir. Since it is separate from the tank outlet on the valve, it is not influenced by the fluctuations of pressures inside the tank outlet, caused by the varying flows returning from the movable members. When the operator decides to activate a particular function on the equipment, the proportional pressure reducing valve associated with that function is operated to vary the hydraulic pressure applied to the ends of the related control spool. Increasing the pressure at one end of the bore, causes the spool to move toward the other end, which positions the spool to open a passage between the pump and a work port connected to the moveable member for the desired function. This connection provides pump flow to the movable function causing the function to move. As the function moves, it displaces fluid and that displaced fluid is connected to the tank outlet on the hydraulic valve by way of the opposite work port and the spool connecting that work port to the tank outlet. While the pressurized end of the spool is forcing the spool to move, the opposite end of the spool is connected to drain and the displaced fluid, caused by the movement of the spool is allowed to pass to drain. When the proportional pressure reducing valve is released, both ends of the bore are reconnected to drain causing the control spool to return to its center position because of the spring biasing.

The manually operated proportional pressure reducing valves, which are located next to the operator, may be replaced with electrical control valves which operate electro-hydraulic proportional pressure reducing valves located on the hydraulic valve. Electrical control simplifies the hydraulic plumbing, as electro-hydraulic pressure reducing valves are located on the hydraulic valves and not next to the operator. This change of technology also facilitates computerized control of various equipment functions. Regardless of using a manual hydraulic or an electro-hydraulic proportional pressure reducing valve, the reduced pressure side of the pressure reducing valves are connected the ends of the spring biased control spool.

The fluids in the system's hydraulic circuit and more specifically, the fluid inside the chambers at the ends of the spool are subject to viscosity changes with ambient temperature changes. The colder the temperature, the more viscous or thicker, the fluid becomes. The degree of viscosity affects the speed of movement of the control spool. A thicker fluid will mean a more sluggish spool movement. It is common practice in cold weather to warm the equipment's system fluid and exchange the cold fluid in the system with warm fluids by operating the moveable functions. The speed at which this exchange of fluid is accomplished depends of the pump's flow capacity and the amount of volume of fluid in the system. The fluid in the bores at the ends of the spool only has an opportunity to transfer fluid when the pressure reducing valves are activated. This transfer of fluid is small, so the process to exchange cold, thick fluid with less thick warmer fluid is slow. This rate of exchange of fluids could be increased if the volume of fluid being transferred was increased. Provided is a way to increase the volume of fluid moving from the ends of the spool to the drain chamber during the beginning of the spool movement, but stop this increase volume exchange, before the spool begins its management of fluids from pump to function and from function to tank.

As best shown in FIG. 2, the increase in fluid exchange between pilot source and drain is accomplished by an annulus groove 40, 42 around the control spool 18 at each end 20, 22. While the spool 18 is in its center position shown in FIG. 2 and detail A, each annulus 40, 42 allows communication from the end of the respective spool bores 30 and 32 to respective drain chambers 44 and 46. The amount of area present for fluid flow is determined by the cylindrical openings at the beginning and ending of each annulus groove 40, 42 and the amount of annulus clearance between the spool bore 30, 32 and the annulus groove 40, 42. These openings will be present until the spool 18 has moved a predetermined distance and closes the cylindrical openings. Before the cylindrical openings are closed, the volume of fluid allowed to pass to drain has been reduced to the annulus area between the spool's main diameter and the spool's bore. When one end of the spool becomes pressurized by the proportional pressure reducing valve, the pressurized fluid is allowed to flow to drain through the annulus groove until the pilot flow exceeds the flow passing to drain and pressure builds in the chamber. After the pressure increases to the point of moving the spool, the cylindrical openings decreases and eventually closes, as shown in detail B in FIG. 2. This annulus flow area is present on both ends 20 and 22 of the spool 18. When one end of the spool is pressurized and begins to move the spool, the displaced fluid in the opposite bore has an extra flow path to drain. This will help keep the opposite bore from building pressure caused by the displaced fluid at the beginning of spool movement. The presence of pressure in the non-activated spool end bore is not wanted because it opposes the pressure in the activated spool end bore and retards the spool movement.

Optionally, the electro-hydraulic proportional pressure reducing valve version can accomplish the fluid exchange without needing to move the spool and the equipment's movable member. This can be done by placing the valve in a warm up mode that energizes the electro-hydraulic pressure reducing valves to a level that produces pressures simultaneously in both ends of the spool at a level of pressure that is less than what is needed to begin movement of the spools. With both ends of the spool slightly pressurized, the oil transfer will occur with the spool remaining in the centered position.

The present application's annulus clearance is not present when the end of the spool is fully pressurized, thereby allowing the annulus clearance in neutral position to be much larger and thus exchange a greater quantity of fluid, and to eliminate or reduce parasitic losses in the shifted condition. In prior designs, the fluid being displaced in the opposite end of the spool has a small pressure differential between the spool end and the drain or tank chamber, so there is little exchange between the annulus clearances, and all of the displaced fluid must pass to either drain or tank by way of the pressure reducing valve. This increases the opportunity for unwanted pressure to be present in the non-activated spool end. Prior designs had an annulus that never shut off. Because they never shut off, the annulus area had to be small. If they were too large, then the end that is pressurized by the proportional pressure reducing valve may pass more fluid to the drain or tank than in what the pilot system can provide, so there is not enough pressure being built up in the end cap to fully shift the spool. With the small annular area, the amount of fluid that it is able to pass in the opposite end cap is small and unwanted pressure is being built up in the end cap in which it is undesirable to have any pressure being built up.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic valve including:
   a valve body having a first end and a second end, a bore extending therebetween, a first drain passage formed as an annular groove on an interior surface of the valve body, and a second drain passage formed as a respective annular groove on the interior surface of the valve body;
   a first end cap coupled to the first end of the valve body and defining with the first end of the valve body a first end bore;
   a second end cap coupled to the second end of the valve body and defining with the second end of the valve body a second end bore; and
   a spool disposed in the bore and biased in a neutral position, the spool separating the first end bore from the second end bore, wherein the spool has a first end and a second end, and wherein the spool includes (i) a first annular groove formed on an exterior surface of the spool such that the first annular groove is axially spaced from the first end of the spool, and (ii) a second annular groove formed on the exterior surface of the spool such that the second annular groove is axially spaced from the second end of the spool,
   wherein when the spool is in the neutral position, the first annular groove forms a first axially extending flow passage that fluidly connects the first end bore to the first drain passage, and the second annular groove forms a second axially extending flow passage that fluidly connects the second end bore to the second drain passage,
   wherein the spool is axially movable relative to the valve body by fluid acting on the first end of the spool or the second end of the spool, and wherein when the spool is axially shifted by a predetermined distance, the spool blocks fluid flow from the first end bore to the first drain passage or from the second end bore to the second drain passage.

2. The hydraulic valve according to claim 1, wherein each of the first annular groove and the second annular groove has a first end and a second end closer to the respective end of the spool than the first end.

3. The hydraulic valve according to claim 2, wherein the second end of the first annular groove or the second annular groove is configured to seal against the bore when the spool has been moved axially to block fluid flow through the first annular groove or the second annular groove.

4. The hydraulic valve according to claim 1, wherein the spool blocks fluid flow from the first end bore to the first drain passage or from the second end bore to the second drain passage by axially moving the first annular groove or the second annular groove out of fluidic communication with a respective end bore and/or a respective drain passage.

5. The hydraulic valve according to claim 1, further including one or more resilient members disposed in each end bore biasing the spool in the neutral position.

6. A hydraulic valve including:
a valve body having a first end and a second end, a bore extending therebetween, and at least one drain passage formed as an annular groove on an interior surface of the valve body;
a spool disposed in the bore, the spool having a first end and a second end and at least one annular groove proximate, and terminating before, the first end or the second end of the spool, wherein when the spool is in a neutral position, the at least one annular groove forms an axially extending flow passage that fluidly connects the at least one drain passage to an end bore disposed at the first end or the second end of the spool, and wherein the spool is axially movable relative to the valve body by fluid acting on the first end of the spool or the second end of the spool, and wherein when the spool is axially shifted by a predetermined distance, the spool blocks fluid flow from the end bore to the at least one drain passage by axially moving the at least one annular groove out of fluidic communication with the end bore and/or the at least one drain passage; and
one or more resilient members disposed in the end bore biasing the spool in the neutral position.

7. The hydraulic valve according to claim 1, wherein when the spool is in the neutral position: (i) the first axially extending flow passage has a first end that partially overlaps with the first drain passage and a second end that is configured to be exposed to fluid disposed in the first end bore such that the first axially extending flow passage fluidly connects the first end bore to the first drain passage, and (ii) the second axially extending flow passage has a respective first end that partially overlaps with the second drain passage and a respective second end that is configured to be exposed to fluid disposed in the second end bore such that the second axially extending flow passage fluidly connects the second end bore to the second drain passage.

8. The hydraulic valve according to claim 7, wherein when the spool is axially shifted by the predetermined distance, the second end of the first axially extending flow passage or the respective second end of the second axially extending flow passage is precluded via the interior surface of the valve body from being exposed to the first end bore or the second end bore, thereby blocking fluid flow from the first end bore to the first drain passage or from the second end bore to the second drain passage.

9. The hydraulic valve according to claim 1, wherein when the spool is in the neutral position: (i) a fluid path is formed from the first end bore to the exterior surface of the spool, through the first axially extending flow passage to the first drain passage, and (ii) a second flow path is formed from the second end bore to the exterior surface of the spool, through the second axially extending flow passage to the second drain passage.

10. The hydraulic valve according to claim 6, wherein the at least one annular groove has a first end and a second end that is closer to a respective end of the spool than the first end of the at least one annular groove, and wherein the second end of the at least one annular groove is configured to seal against the bore when the spool has been moved axially the predetermined distance, thereby blocking fluid flow through the at least one annular groove.

11. A hydraulic valve including:
a valve body having a first end and a second end, a bore extending therebetween, a first drain passage formed as an annular groove on an interior surface of the valve body, and a second drain passage formed as a respective annular groove on the interior surface of the valve body;
a spool disposed in the bore and having a first end and a second end, wherein the spool includes (i) a first annular groove formed on an exterior surface of the spool such that the first annular groove is axially spaced from the first end of the spool, and (ii) a second annular groove formed on the exterior surface of the spool such that the second annular groove is axially spaced from the second end of the spool;
a first end cap coupled to the first end of the valve body and defining with the first end of the valve body a first end bore;
a second end cap coupled to the second end of the valve body and defining with the second end of the valve body a second end bore; and
one or more resilient members disposed in each end bore biasing the spool in a neutral position at which the first annular groove forms a first axially extending flow passage that fluidly connects the first end bore to the first drain passage, and the second annular groove forms a second axially extending flow passage that fluidly connects the second end bore to the second drain passage,
wherein the spool is axially movable relative to the valve body by fluid acting on the first end of the spool or the second end of the spool, and wherein when the spool is shifted by a predetermined distance, the spool blocks fluid flow from the first end bore to the first drain passage or from the second end bore to the second drain passage.

* * * * *